C. PHELPS.
HOLD-BACK ATTACHMENTS.
No. 182,327. Patented Sept. 19, 1876.
Fig. 1. Fig. 2. Fig. 3.
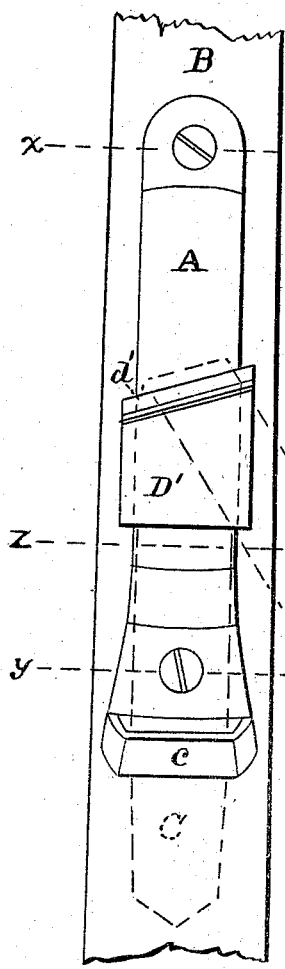 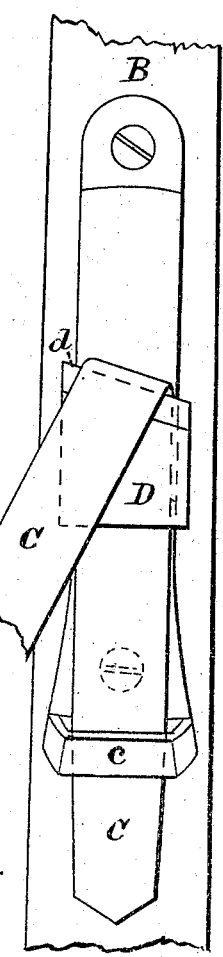 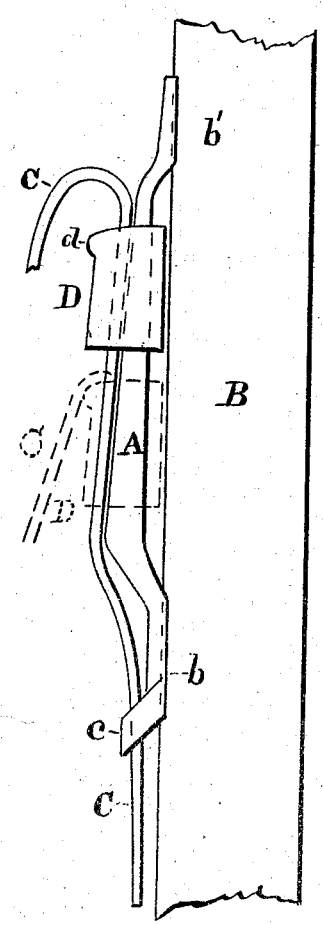
Fig. 4. Fig. 5. Fig. 6.
  
Witnesses:
Henry A. Daniels
Theodore Mungen
Inventor:
C. Phelps
by Wm Burris
Attorney.

UNITED STATES PATENT OFFICE.

CHAMBERLAYNE PHELPS, OF RENSSELAER FALLS, NEW YORK.

IMPROVEMENT IN HOLDBACK ATTACHMENTS.

Specification forming part of Letters Patent No. 182,327, dated September 19, 1876; application filed July 26, 1876.

*To all whom it may concern:*

Be it known that I, CHAMBERLAYNE PHELPS, of Rensselaer Falls, in the county of St. Lawrence and State of New York, have invented certain new and useful Improvements in Holdback Attachments for Carriages; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is a plan view of a holdback for the left shaft. Fig. 2 is a plan view of a holdback for the right shaft. Fig. 3 is a side view. Figs. 4, 5, and 6 are sectional views of the plate on lines $x$ $y$ $z$ of Fig. 1.

My invention relates to holdback attachments for carriages; and consists of a wedge-shaped plate provided with a loop for holding the end of the holdback-strap, and with rests for attaching the holder to the shaft of the carriage, in combination with a wedge-shaped collar, adjusted to slide on the wedge-shaped plate, and to hold the holdback-strap between it and the plate, and provided with a diagonal curved flange for a rest for the strap, as hereinafter more fully described.

A represents wedge-shaped plates, hollowed, to lighten and cheapen them, as shown by sectional view $z$, Fig. 6, and provided with concave bearings $b$ $b'$, having holes to receive the screws or bolts which fasten them to the thills B. The back ends of the holders are provided with loops $c$ to receive the ends of the holdback-straps C. D D' represent wedge-shaped collars, adjusted to slide on the plates, and provided with diagonal rounded lips $d$ $d'$, forming bearings for the under side of the holdback-straps.

These bearings are formed diagonally to the line of the sides of the collars, and their inclination is reversed for left and right holders to conform to the position of the holdback-straps when attached to the holders, as shown in Figs. 1 and 2 of the drawings.

The collars are made sufficiently large to admit the straps loosely between the top of the plates and collars, when the latter are moved forward to the smaller part of the plates.

In attaching the holdback-straps, their ends are inserted at the forward end of the collars, on the top of the plates, and are extended through the collars and through the loops, as shown in the drawings, and backward pressure upon the straps slides the collars backward to the thicker part of the plates, wedging the straps tightly between the collars and plates, as shown by dotted lines in Fig. 3 of the drawings, and the greater the backward pressure upon the shafts, the tighter they will be clamped in the holders.

To loosen the straps, they are pressed forward, sliding the collars to the smaller part of the plates, loosening the straps and permitting them to be readily removed from the holders; and when, by accident, the tugs may be broken, or become unfastened, the forward movement of the horse or backward movement of the carriage will loosen and free the straps from the holders.

What I claim as new, and desire to secure by Letters Patent, is—

1. A holdback attachment for carriages consisting of a wedge-shaped plate, in combination with a collar adjusted to slide on the plate, substantially as and for the purposes described.

2. In a holdback attachment for carriages having plates A and collars D D', the diagonal bearings $d$ $d'$ for the holdback-straps, substantially as described.

3. The holdback attachments for carriages consisting of plates A, having concave bearings $b$ $b'$ and loops $c$, in combination with the wedge-shaped collars D D', having left and right diagonal strap-bearings $d$ $d'$, substantially as described.

In testimony that I claim the foregoing as my own invention I affix my signature in presence of two witnesses.

CHAMBERLAYNE PHELPS.

Witnesses:
ABEL S. BARTER,
AGNES B. BROWNE.